United States Patent Office 3,112,168

Patented Nov. 26, 1963

1

3,112,168

DIRECT PRODUCTION OF LITHIUM BORATE

Maurice Archambault, Quebec, Quebec, and Charles A. Olivier, Ste.-Foy, Quebec, Canada, assignors to Department of Natural Resources, Quebec, Quebec, Canada No Drawing. Filed Jan. 13, 1961, Ser. No. 82,389
10 Claims. (Cl. 23—31)

This invention relates to the direct production of lithium borate from calcined lithium-bearing silicates and related compounds, more especially from beta-spodumene.

In order to achieve a satisfactory extraction of lithium, the decomposition of these silicates with alkali metal salts involves specific conditions, depending upon the particular alkali metal salt employed. The commercial processes for producing lithium salts generally do not act on the silicates directly with the alkali metal salts, but employ relatively drastic preliminary steps, for example, decomposition with excess sulfuric acid to form lithium bisulfate and a discardable residue. The lithium bisulfate is then dissolved and the resulting aqueous solution neutralized, while its impurities are eliminated by repetitive precipitations and filtrations. Then the lithium is precipitated as lithium carbonate by the addition of sodium carbonate. Finally, to produce lithium borate the above-mentioned lithium carbonate is treated with boric acid, under conditions that are costly.

The applicants have now found that a solution of sodium tetraborate ($Na_2B_4O_7$, known commonly as borax) may advantageously be used alone to directly decompose calcined crystalline lithium-bearing silicates, producing thereby a lithium borate solution from which crystalline lithium borate is recovered through fractional crystallization. This finding provides a novel, economic and simple method of producing lithium borate: (*a*) the primary raw lithium solution they obtain does not need to be neutralized and purified, (*b*) the formation of lithium carbonate as an intermediate product is eliminated and (*c*) the expensive reaction of boric acid with lithium carbonate is by-passed.

In the applicants' process, the calcined crystalline lithium-bearing silicate is reacted with a solution of sodium tetraborate in a pressure vessel at a temperature ranging from about 175° C. to about 275° C. for about 10 minutes to about 2 hours, the precise time depending on the temperature and on the amount of reactant used.

The decomposition step is carried out under pressure, as a means of maintaining the water in the liquid phase. Otherwise, the degree of pressure is not critical and will vary with the other conditions of the reaction. Appropriate equipment for withstanding pressure usually encountered with this type of reaction must be employed.

For good extraction and for short reaction time, the strength of the aqueous sodium tetraborate solution should be between about 5% and about 20% by weight, preferably between about 9% and about 17%. If economy were not a factor, the amount of reactant in the reaction mixture might vary widely. However, the applicants have found that an approximate excess of 10% to 80% and preferably between about 20% and about 40% is particularly effective, when economy and other factors are considered. They have also found that the action of the sodium tetraborate was considerably impaired by addition of the corresponding calcium salt, in contradiction with a recent broad paper disclosure stating that lithium extraction from beta-spodumene was improved when both sodium and calcium salts were jointly used.

In the applicants' process, the aqueous slurry coming out of the pressure reaction vessel contains soluble lithium tetraborate and exess sodium tetraborate together with an insoluble sodium aluminosilicate. Excess sodium tetraborate is dissolved along with the lithium tetraborate formed. The total amount of water needed for complete solubilization of the lithium may be from about 45 to about 110 times the weight of the lithium oxide present in the charge. The amount of water necessary depends mostly on the efficiency of leaching and on the excess of sodium tetraborate used in the primary reaction. The leaching is preferably effected at a temperature approaching the boiling point of the solution, since both sodium and lithium tetraborates are much more soluble in hot water.

The mother liquor which contains almost only sodium and lithium tetraborate is then submitted to fractional crystallization, and this, without any previous purification. To the unspent sodium tetraborate thus recovered, make-up sodium tetraborate is added to decompose a new charge of calcined lithium-bearing silicate, while the lithium tetraborate is recovered as a crystalline hydrated salt which, if desired, may be dehydrated.

TECHNOLOGY

The calcined lithium-bearing silicate is preferably ground to pass through a 100–150 mesh screen and analysed. The material is then delivered to a slurry tank containing the proper amount of borax or sodium tetraborate solution; the slurry is kept hot and agitated before being poured into the pressure-vessel. The autoclave as well as all the equipment used throughout the process do not need to be of expensive stainless steel; it could be of a low-carbon steel, since the borates are known to act as corrosion inhibitors.

As the reaction takes place in a fluid medium, the pressure-vessel must be equipped with a good stirring device. The heating may be done either with electricity or steam and the heating surfaces are preferably located inside the autoclave to minimize heat losses. After the reaction is completed, the product is discharged through releasing the pressure by opening a valve located at the bottom of the vessel. Another way of doing this transfer is to decrease first the pressure of the autoclave by lowering the temperature of its content with the aid of a cooling coil installed inside the autoclave and when the pressure is low enough, the aqueous product is flushed out through the bottom valve. Then the slurry is filtered on vacuum filters while still near the boiling temperature. The filter cake is subsequently repulped with hot water and filtered again. This way, practically all the soluble borates are leached from a solid residue that may be discarded. The mother liquor combined with the washings are then submitted to fractional crystallization. There are two different ways of proceedings, depending on the excess of sodium tetraborate used. When a large excess of sodium tetraborate is used, for example over about 40%, unspent sodium tetraborate crystallizes out first, while for a small excess, lithium tetraborate is the first to come out and most of the unspent sodium tetraborate remains in solution and is returned as such to the primary reaction step with fresh make-up sodium tetraborate and water.

STARTING MATERIALS

The lithium-bearing minerals that are particularly amenable to treatment by the applicants' process are the following:

(1) Spodumene: $Li_2O.Al_2O_3.4SiO_2$
(2) Petalite: $Li_2O.Al_2O_3.8SiO_2$
(3) Eucryptite: $Li_2O.Al_2O_3.2SiO_2$
(4) Lepidolite or lithium-mica:

$$(Li, K, Na)_2Al_2(SiO_3)_3(F, OH)_2$$

Before being treated, the above mentioned silicates require a calcining treatment at temperatures of which the minima vary according to the minerals, from about 680° C. to about 980° C., to cause their crystal lattice to change or their dissociation to occur.

For spodumene, the modification is known to take place above about 870° C., and to be only a change in the crystalline structure; this calcined spodumene is called beta-spodumene.

For petalite, the heating to about 680° C., is known to cause its dissociation to beta-spodumene and free silica.

For eucryptite, heating to around 980° C., produces its conversion from trigonal structure to a new allotropic form, called the hexagonal form.

For lepidolite, heating to about 850° C., is known to cause the evolution of its volatile elements (F and OH) and its breaking down to para-lepidolite which seems to be a mixture of beta-spodumene, nephelite and leucite.

When treated with borax solution, calcined lepidolite, petalite and eucryptite would behave essentially like beta spodumene. Consequently, those skilled in the art will understand that the examples using beta spodumene, given hereafter, in view of explaining the process in more details would apply to the other above-mentioned lithium-bearing silicates, as well.

EXAMPLES

All the following examples have been conducted in the same general manner, borax being added to the proper amounts of beta-spodumene and of water. The beta-spodumene used for these examples was a concentrate containing 4.5% $Li_2O$ which represents a mixture of approximately 60% beta-spodumene, 25% feldspars (Na, K, Ca, Al-silicates) and 15% quartz (free silica).

The amount of sodium tetraborate was calculated according to the lithium oxide present in the charge and an excess over this theoretical amount was added. Water was supplied in such an amount as to give a predetermined concentration of the solution. The slurry was then poured into a pressure vessel and heated up to the temperature of reaction and under constant agitation. After completion of reaction, the products were flushed out of the autoclave with a without previous cooling. The undissolved residue was then leached with hot water and the leached solid residue was analysed to determine the recovered lithium.

*Table 1*

EFFECT OF STARTING SOLUTION STRENGTH [1]

| Strength of solution: $Na_2B_4O_7$, percent by weight | Excess $Na_2B_4O_7$, 10% | | Excess $Na_2B_4O_7$, 30% | | Excess $Na_2B_4O_7$, 70% | |
|---|---|---|---|---|---|---|
| | Test No. | Li extr., percent | Test No. | Li extr., percent | Test No. | Li extr., percent |
| 4.75 | 111, 120 | [2] 62 | 160 | 70 | 108 | 89 |
| 9.1 | 106, 146 | [2] 83 | 161 | 89 | 98, 109, 118 | [2] 92 |
| 13.0 | 93, 114 | [2] 83 | 149 | 95 | 99, 115 | [2] 92.5 |
| 16.7 | 94 | 81 | 158. | 89 | 100, 110, 119 | [2] 84 |
| 20.0 | 95 | 78 | 159 | 88 | | |
| 23.1 | 101 | 76 | | | 102, 141 | [2] 82 |
| 25 | ------- | ------- | 174 | 84.5 | | |

[1] These experiments were conducted at 200° C. for 1 hour.
[2] These figures are the averages of the results obtained.

From Table 1, it is seen that whatever the excess of sodium tetraborate used, the best results are obtained when the starting solution strength lies between about 9 and about 17%. It may also be estimated that, in this range of solution strength, the optimum excess of sodium tetraborate over the stoichiometric amount is about 30%. Indeed, further experiments which were performed with sodium tetraborate in 20% and 40% excess to compare with the results previously obtained with a 30% excess and using the same solution strength, i.e., 13%, have shown a drop in the lithium extraction from 95% to 86% and 92% with 20% and 40% excess, respectively.

The time required for reaction depends on the temperature used. The applicants have found that at 175° C. when only a 10% excess of $Na_2B_4O_7$ is used, the reaction is incomplete even after 1 hour; in similar conditions, at 200° C. the reaction is complete while at 225–235° C. the reaction is complete in about 30 minutes. However, it seems from Table II that with a 30% excess as well as with a 10% excess, other factors being the same, a reaction time of about 1 hour is required to obtain the maximum extraction yield.

*Table II*

Effect of Reaction Time [1]

| Reaction time (hours) | Excess $Na_2B_4O_7$, 10% | | Excess $Na_2B_4O_7$, 30% | |
|---|---|---|---|---|
| | Test No. | Li extr., percent | Test No. | Li extr., percent |
| 0.5 | 104 | 50 | 147 | 73 |
| 1 | 93 | 85 | 149 | 95 |
| 2 | 105 | 83 | 148 | 95 |

[1] These experiments were effected at 200° C., and with a starting solution strength of 13.1%.

Table II shows also that the best recovery obtained after 1 hour at 200° C. with a 10% excess is about 85% while it reaches 95% with an excess of 30%; it shows also that, in these conditions, increasing the time of reaction does not improve lithium extraction.

The combined lithium-bearing solution and washings which were obtained when filtering the leached solid residue are then treated either to crystallize out consecutively the excess sodium tetraborate and the newly formed lithium tetraborate, or depending on the sodium tetraborate concentration, to crystallize out hydrated lithium tetraborate from excess sodium tetraborate solution.

SPECIAL EXAMPLE

*(Joint Action of Sodium and Calcium Tetraborates)*

To 100 grams of a beta-spodumene concentrate containing 4.5% $Li_2O$ were added 31 grams of sodium tetraborate ($Na_2B_4O_7$) and 29 grams of calcium tetraborate ($CaB_4O_7$) (each borate being in stoichiometric amount). The mixture was then slurried by the addition of 310 grams of water and heated in an agitated pressure vessel at 200° C. for 1 hour. The reaction mixture was then filtered while still boiling and the filter cake was repulped with 150 parts of boiling water and filtered. The resulting insoluble residue was found to contain over 80% of the lithium oxide present in the beta spodumene charge. This indicates clearly that the presence of calcium tetraborate inhibits instead of promoting lithium extraction.

Those skilled in the art have realized by the above description that the applicants' process is very simple and very economic to operate and that it lends itself to cyclic operation.

Having now described their invention, the applicants claim:

1. A process for extracting lithium from a calcined crystalline lithium-bearing silicate, comprising, leaching said silicate under hydrothermal conditions at a temperature within the range from about 175° C. to about 275° C., under a pressure effective to maintain the water in its liquid phase, for a time ranging from about 10 minutes to about 2 hours with an aqueous solution containing from about 9 to about 17% by weight of sodium tetraborate thereby to produce a mixture containing hot water-soluble lithium borate and solid sodium aluminosilicate residue the amount of sodium tetraborate ranging from about 10% to about 80% over the stoichiometric amount to react with the lithium present in the lithium-bearing silicate, and separating the lithium borate from the residue.

2. A process for extracting lithium from calcined crystalline lithium-bearing silicate, which comprises: reacting said silicate under pressure by contact with a 9 to 17% aqueous solution of sodium tetraborate, in which the sodium tetraborate is present at from about 10 to about 80% over the stoichiometric amount to react with the lithium present in the charge, at a temperature from about 175° C. to about 275° C., under pressure effective to maintain the water in its liquid phase, for a time within the range from about 10 minutes to about 2 hours, thereby to transform the lithium of the silicate into water soluble lithium tetraborate and separating the lithium borate from the residual silicate.

3. A process for extracting lithium from calcined crystalline lithium-bearing silicate, which comprises: reacting said silicate under pressure by contact with an aqueous solution of sodium tetraborate containing from about 9% to about 17% thereof by weight, said solution being in an amount sufficient to provide an excess of sodium tetraborate over the stoichiometric amount to react with the lithium content of the silicate and from about 10 to about 80%, at a temperature ranging from about 175° C. to about 275° C. under pressure effective to maintain the water in its liquid phase and for a time ranging from about 10 minutes to about 2 hours, thereby transforming the lithium content of the silicate into water-soluble lithium tetraborate, and separating the lithium borate from the residual silicate.

4. A process for extracting lithium from calcined crystalline lithium-bearing silicate, which comprises: reacting said silicate by contact with an aqueous solution of sodium tetraborate containing from about 9% to about 17% of said borate, said solution being in an amount sufficient to provide sodium tetraborate in an excess of about 10% to about 80% over the stoichiometric amount required to react with the lithium content of the silicate, at a temperature ranging from about 175° C. to about 275° C., under pressure effective to maintain the water in its liquid phase for from about 10 minutes to about 2 hours thereby to transform the lithium content of the silicate into water-soluble lithium tetraborate, adding hot water to dissolve completely their soluble tetraborate content, and separating the hot lithium-bearing solution from the leached solid residue.

5. A process for producing lithium tetraborate from calcined crystalline lithium-bearing silicate, which comprises: reacting said silicate by contact with an aqueous solution of sodium tetraborate containing between about 9% and about 17% of sodium tetraborate, said solution being in an amount sufficient to provide anhydrous sodium tetraborate in an excess between about 20% and about 40% over the stoichiometric amount required for the lithium present, at a temperature from about 175° C. to about 275° C. under pressure effective to maintain the water in its liquid phase for from about 10 minutes to about 2 hours to transform the lithium content of the silicate into water-soluble lithium tetraborate, adding hot water so as to complete the dissolution of its soluble borates content, separating hot lithium-bearing solution from the leached solid residue by filtration, submitting the clear filtrate to fractional crystallization to sort out hydrated crystalline lithium tetraborate from excess sodium borate solution.

6. A cyclic process for producing lithium tetraborate directly from calcined crystalline lithium-bearing silicate, which comprises the steps of (*a*) continuously decomposing said silicate by contact under pressure, with a solution of sodium tetraborate in an excess over the stoichiometric amount from about 10 to about 80%, in the presence of enough water to give a solution containing from about 9 to about 17% of sodium tetraborate, at a temperature from about 175° C. to about 275° C. the pressure being effective to maintain the water in its liquid phase at the temperature of treatment for from about 10 minutes to about 2 hours to transform the lithium content of the original silicate into water-soluble lithium tetraborate; (*b*) dissolving at a temperature nearing 100° C. the hot product obtained in the decomposing step with additional water in an amount sufficient to complete the dissolution of its soluble borates content; separating the hot lithium-bearing solution from the leached solid residue; (*c*) recovering crystalline lithium tetraborate by submitting to fractional crystallization the clear leach solution, so as to separate unspent sodium tetraborate solution from the crop of lithium tetraborate crystals; and (*d*) recycling the mother solution containing unspent sodium tetraborate and lithium tetraborate that escaped crystallization.

7. A process, as defined in claim 1, wherein the lithium-bearing silicate in beta-spodumene.

8. A process, as defined in claim 1, wherein the lithium-bearing silicate treated is lepidolite previously calcined to at least about 850° C.

9. A process, as defined in claim 1, wherein the lithium-bearing silicate treated is petalite previously calcined to at least about 680° C.

10. A process, as defined in claim 1, wherein the lithium-bearing silicate treated is eucryptite calcined to at least about 980° C.

References Cited in the file of this patent

UNITED STATES PATENTS

| | | |
|---|---|---|
| 2,793,933 | Kroll | May 28, 1957 |
| 2,829,962 | Supiro | Apr. 8, 1959 |

FOREIGN PATENTS

| | | |
|---|---|---|
| 596,302 | Canada | Apr. 19, 1960 |

UNITED STATES PATENT OFFICE

CERTIFICATE OF CORRECTION

Patent No. 3,112,168 November 26, 1963

Maurice Archambault et al.

It is hereby certified that error appears in the above numbered patent requiring correction and that the said Letters Patent should read as corrected below.

In the grant, lines 2 and 3, for "assignors to Department of Natural Resources, of Quebec, Quebec, Canada" read -- assignors to Ministere des Richesses Naturelles, Province de Quebec, of Quebec, Quebec, Canada --; line 12, for "Department of Natural Resources, its successors" read -- Ministere des Richesses Naturelles, Province de Quebec, its successors --; in the heading to the printed specification, lines 4 and 5, for "assignors to Department of Natural Resources, Quebec, Quebec, Canada" read -- assignors to Ministere des Richesses Naturelles, Province de Quebec, Quebec, Quebec, Canada --.

Signed and sealed this 4th day of August 1964.

(SEAL)
Attest:

ERNEST W. SWIDER
Attesting Officer

EDWARD J. BRENNER
Commissioner of Patents